(12) United States Patent
Granada, Jr. et al.

(10) Patent No.: US 7,514,489 B2
(45) Date of Patent: Apr. 7, 2009

(54) FLAME-RETARDANT MAGNESIUM HYDROXIDE COMPOSITIONS AND ASSOCIATED METHODS OF MANUFACTURE AND USE

(75) Inventors: Lemuel O. Granada, Jr., Manistee, MI (US); James Innes, Mount Vernon, WA (US); David Morgan Smith, Kearneysville, WV (US); Mark Wajer, Nottingham, MD (US)

(73) Assignee: Martin Marietta Materials, Inc., Raleigh, NC (US)

( * ) Notice: Subject to any disclaimer, the term of this patent is extended or adjusted under 35 U.S.C. 154(b) by 303 days.

(21) Appl. No.: 11/563,274

(22) Filed: Nov. 27, 2006

(65) Prior Publication Data

US 2007/0176155 A1 Aug. 2, 2007

Related U.S. Application Data

(60) Provisional application No. 60/740,092, filed on Nov. 28, 2005.

(51) Int. Cl.
C08K 3/22 (2006.01)
C09C 1/04 (2006.01)
C01F 5/14 (2006.01)

(52) U.S. Cl. .................... 524/436; 423/635; 423/636

(58) Field of Classification Search ............... 423/635, 423/636; 524/436
See application file for complete search history.

(56) References Cited

U.S. PATENT DOCUMENTS

| | | |
|---|---|---|
| 4,834,957 A | 5/1989 | Van de Walle |
| 4,943,301 A | 7/1990 | Nagle et al. |
| 5,143,965 A | 9/1992 | Mertz |
| 5,407,464 A | 4/1995 | Kaliski |
| 5,461,101 A | 10/1995 | Rothon et al. |
| 5,500,331 A | 3/1996 | Czekai et al. |
| 5,514,357 A | 5/1996 | Richmond et al. |
| 5,552,469 A | 9/1996 | Beall et al. |
| 5,704,556 A | 1/1998 | McLaughlin |
| 5,705,141 A | 1/1998 | Dumont et al. |
| 5,762,901 A | 6/1998 | Richmond et al. |
| 5,824,279 A | 10/1998 | Richmond et al. |
| 5,872,169 A | 2/1999 | Elsner et al. |
| RE36,369 E | 11/1999 | Wajer et al. |
| 5,989,517 A | 11/1999 | Richmond et al. |
| 6,043,306 A | 3/2000 | Imahashi |
| 6,130,282 A | 10/2000 | Imahashi et al. |
| 6,676,920 B1 | 1/2004 | Oishi et al. |
| 7,052,578 B2 | 5/2006 | Wajer et al. |
| 2005/0150441 A1 | 7/2005 | Smyrniotis et al. |
| 2006/0177366 A1 | 8/2006 | Smyrniotis et al. |

FOREIGN PATENT DOCUMENTS

| | | |
|---|---|---|
| EP | 0 568 488 A2 | 11/1993 |
| JP | 07-207134 A | 8/1995 |
| JP | 07-228762 A | 8/1995 |
| JP | 07-331092 A | 12/1995 |
| JP | 08-151449 A | 6/1996 |
| JP | 08-259806 A | 10/1996 |
| JP | 08-259846 A | 10/1996 |
| JP | 2001256560 A | 8/2001 |
| WO | WO 93/04117 A1 | 3/1993 |

OTHER PUBLICATIONS

"Compounding Metal Hydrate Flame Retardants", *Plastics Additives & Compounding*, Apr. 2002.
"MagShield® S and MagShield® UF Particle Size Curves", Martin Marietta Magnesia Specialties Inc., Sep. 2000.
"MagShield® UF Standard Grade Magnesium Hydroxide for Flame Retardant Applications Data Sheet with Specifications", Martin Marietta Magnesia Specialties Inc., May 2005—rev. Apr. 2007.
"MagShield® S Standard Grade Magnesium Hydroxide for Flame Retardant Applications Data Sheet with Specifications", Martin Marietta Magnesia Specialties Inc., May 2005—rev. Apr. 2007.
"MagShield® UF-NB10 Ultra-fine Grade Magnesium Hydroxide for Flame Retardant Applications Data Sheet with Specifications", Martin Marietta Magnesia Specialties Inc., May 2005.
Glen Mills Inc. "Tech Tips IV, Wet, Grinding, Abrasion Machines", 2002. See at http://www.glenmills.com/technical_library/techtips4.pdf.
Glen Mills Inc. "Tech Tips 9, The Media Issue; grinding media and the mills that use it", 2004. See at http://www.glenmills,com/technical_library/techtips9.pdf.
Mark et al. "Peroxides and Peroxy Compounds, Inorganic, to Piping Systems", *Kirk-Othmer Encyclopedia of Chemical Technology*, 1989, pp. 877-878, vol. 17.
Perry et al. "Perry's Chemical Engineers' Handbook, Sixth Edition", 1985, p. 8-35.

*Primary Examiner*—Peter Szekely
(74) *Attorney, Agent, or Firm*—Alston & Bird LLP

(57) ABSTRACT

The invention provides a submicron magnesium hydroxide particulate composition comprising a first distribution of magnesium hydroxide particles having a D50 of no more than about 0.30 µm, a D90 of no more than about 1.5 µm, and a BET surface area of at least about 35 m$^2$/g, which can be used as a flame-retardant additive for synthetic polymers, optionally in combination with other flame-retardant additives such as nanoclays and larger-sized magnesium hydroxide particulate compositions. Polymeric resins comprising the submicron magnesium hydroxide particles and methods of manufacturing submicron magnesium hydroxide particles are also provided.

37 Claims, No Drawings

US 7,514,489 B2

FLAME-RETARDANT MAGNESIUM HYDROXIDE COMPOSITIONS AND ASSOCIATED METHODS OF MANUFACTURE AND USE

CROSS-REFERENCE TO RELATED APPLICATIONS

The present application claims the benefit of Application Ser. No. 60/740,092, filed Nov. 28, 2005, which is incorporated herein by reference in its entirety and for all purposes.

FIELD OF THE INVENTION

The invention relates to magnesium hydroxide particulate compositions including submicron particles, methods of making such compositions, and polymeric articles incorporating such compositions as a flame retardant.

BACKGROUND OF THE INVENTION

Thermoplastic polymers that are easily molded into a variety of shapes, sizes, and thicknesses are commonly used in virtually every category of consumer and industrial articles. Although their use has become ubiquitous, such polymers do present drawbacks that must be addressed. The increasing awareness of the dangers of fire and smoke associated with the use of plastics has led to legislation and standardization of plastics formulations with regard to flame retardancy.

Organohalogen compounds, antimony trioxide, and combinations thereof have been used as a flame retardant additive for plastic materials. However, such additives can generate a significant amount of smoke and toxic gases upon exposure to flame. As a result, attempts have been made to minimize their use in favor of less toxic alternatives.

More recently, the use of magnesium hydroxide particles or aluminum hydroxide particles as a safer alternative has become increasingly prevalent. Magnesium hydroxide provides excellent flame retardant properties, as well as smoke suppression, in a variety of plastics including wire and cable applications. Magnesium hydroxide is also a non-toxic, non-corrosive additive, and it is often incorporated into elastomeric and plastic compounds where a non-halogen solution to fire resistance and smoke suppression is preferred.

Magnesium hydroxide undergoes an endothermic decomposition beginning at about 330° C. according to Formula (I) below:

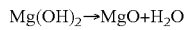

$$Mg(OH)_2 \rightarrow MgO + H_2O \quad (I)$$

The endothermic decomposition of $Mg(OH)_2$, which occurs during combustion, is the flame retardant mechanism. The water released during combustion has the effect of diluting the combustible gases and acts as a barrier, preventing oxygen from supporting the flame. The smoke suppression properties of magnesium hydroxide are believed to be due to the dilution effect of the water vapor on the combustible gases or due to a char formation with the polymer.

Despite the advantages of magnesium hydroxide, its use can be problematic in certain applications. For instance, to obtain very high levels of flame retardant ability (e.g., UL 94 rating), flame retardant additives must be added in large amounts, such as greater than 60 percent by weight, which can adversely impact the physical characteristics of the polymeric resin and render it unsuitable for application such as wire and cable insulation.

Although existing magnesium hydroxide particulate compositions offer some measure of flame resistance and smoke suppression, there remains a need in the art for compositions that offer even greater levels of fire protection without sacrificing the beneficial physical properties of the polymeric resin to which the flame retardant composition is added.

BRIEF SUMMARY OF THE INVENTION

The present invention provides a magnesium hydroxide composition suitable for use as a flame-retardant additive in polymeric resin compositions. The magnesium hydroxide compositions of the invention exhibit submicron particle size and high particle surface area, resulting in improved flame resistance properties. Preferred embodiments of the magnesium hydroxide particulate compositions of the invention are characterized by a first distribution of particles having a D50 of no more than about 0.30 µm, a D90 of no more than about 1.5 µm, and a BET surface area of at least about 35 m²/g. In preferred embodiments, the magnesium hydroxide particles are coated with a surface active agent, such as various fatty acids or salts or esters of fatty acids. Particularly preferred surface active agents include calcium stearate and stearic acid.

The above-described magnesium hydroxide composition can be admixed with other flame retardant additives, particularly other flame retardants characterized by a different particle distribution. For example, the composition can be mixed with a second distribution of magnesium hydroxide particles having a D50 of at least about 0.9 µm and a BET surface area of no more than about 30 m²/g.

In another aspect, the invention provides a flame-retardant additive composition, comprising (a) a first distribution of magnesium hydroxide particles having a D50 of at least about 0.9 µm and a BET surface area of no more than about 30 m²/g; and (b) a second composition comprising (i) a plurality of nanoclay particles; (ii) a second distribution of magnesium hydroxide particles having a D50 of no more than about 0.30 µm, a D90 of no more than about 1.5 µm, and a BET surface area of at least about 35 m²/g; or (iii) a combination of (i) and (ii). Preferred nanoclays are derived from a hydrotalcite.

In another aspect of the invention, a polymeric resin composition is provided. The polymeric resin composition comprises a mixture of a synthetic polymer, such as a thermoplastic polymer, a thermosetting polymer, or an elastomer, and the above-described magnesium hydroxide composition or flame-retardant additive composition of the invention. Various synthetic polymers can be used in the polymeric resin composition, such as olefin (α-olefin) polymers and copolymers, copolymers of olefins with dienes, ethylene-acrylate copolymers, polystyrene and copolymers of styrene, thermoplastic polyolefin (TPO), vinyl chloride or vinyl acetate polymers or copolymers, phenoxy resin, polyacetal, polyamide resin, acrylic and methacrylic resin, butadiene, polyurethane, polyester, polycarbonate, polyketone, diallyl phthalate resin, phenolic resin, epoxy resin, melamine resin, alkyd resin, urea resin, and synthetic rubbers.

In a further aspect, the invention provides a molded polymeric article comprising the above-described polymeric resin composition that includes the flame-retardant magnesium hydroxide particles of the invention or the above-noted flame-retardant additive composition. The polymeric article can take a variety of forms depending on the desired end use. Exemplary polymeric articles include cable and wire sheathing, electronic components, automobile components, and the like.

In yet another aspect, the present invention provides a method of manufacturing the magnesium hydroxide composition described above. The method preferably comprises providing an aqueous slurry of magnesium hydroxide particles (e.g., particles having a D50 particle size of at least about 0.9 µm) or magnesium oxide particles, the aqueous slurry preferably comprising no more than about 62 weight percent solids based on the total weight of the slurry. The aqueous slurry is subjected to a grinding step utilizing grinding media having a diameter of no more than about 0.5 mm, and in certain embodiments no more than about 0.3 mm. During the grinding step, the weight percent of solids in the aqueous slurry is maintained at or below about 62% by addition of an aqueous solution and/or the viscosity of the slurry is maintained at no more than about 1,000 cP, for example by addition of an aqueous solution or a viscosity modifier.

The RPM of the grinding mill is preferably maintained at no more than about 6,000 and no less than about 2,000 (e.g., 3,000). The preferred solids content of the aqueous slurry is no more than about 55% solids by weight, more preferably no more than about 50%, and most preferably no more than about 45%. Preferred examples of the grinding media include zirconium oxide, zirconium silicate, and yttrium-doped tetragonal zirconia polycrystals.

DETAILED DESCRIPTION OF THE INVENTION

The present invention now will be described more fully hereinafter. However, this invention may be embodied in many different forms and should not be construed as limited to the embodiments set forth herein; rather, these embodiments are provided so that this disclosure will satisfy applicable legal requirements. As used in this specification and the claims, the singular forms "a," "an," and "the" include plural referents unless the context clearly dictates otherwise.

The term "submicron" as used herein refers to particles having at least one dimension that is in the range of less than about 1 µm.

All particle size parameters referenced herein, such as median particle size, D90 values, and the like, are measured using a SediGraph 5100 particle size analyzer made by MICROMERITICS® of Norcross, Ga. Prior to testing, a sample is dried and ground through a 50 mesh screen (U.S. Standard). Thereafter, 3.0 g is placed in a clean 100 ml beaker with a stirring bar and 50 ml of A-11 SEDISPERSE or water is added. The sample is stirred for several minutes, followed by placement of the sample in a sonic bath for 20 minutes. The sample is then stirred for several more minutes and placed back in the sonic bath for 20 additional minutes. The sample is then stirred for a couple of minutes to ensure the sample is entirely suspended. The sample is then ready for testing on the particle size analyzer. Particle size measurements refer to uncoated particles.

The term "DX value" where X is 50 or 90, as used herein, is the measured particle diameter upper limit for particles falling within the bottom 50% or 90% by mass, respectively, of the particle distribution. For example, a D50 value of 0.3 µm means 50% of the particles in the distribution by mass have a diameter of greater than 0.3 µm and 50% of the particles by mass have a diameter lower than 0.3 µm. The D50 value is also referred to as the median particle size herein.

The term "BET surface area" refers to the surface area of particles according to the invention measured in units of m²/g, and calculated using the BET method of surface area determination. A FLOWSORB II 2300 instrument made by MICROMERITICS® of Norcross, Ga. is used to make the measurement.

The present invention provides a magnesium hydroxide particulate composition characterized by the presence of submicron particles that have a small particle size and large surface area, which contribute to improved flame resistance and smoke suppression performance when used as an additive for polymeric resins. Although the invention is not bound by any particular theory of operation, it is believed that the smaller particle size and increased surface area of the compositions of the invention contribute to better flame retardant performance due to greater dispersion of the particulate material within the polymeric resin. The flame-retardant magnesium hydroxide compositions of the invention are also substantially halogen-free, and typically contain no more than about 2,500 ppm chloride (e.g., no more than about 2,000 ppm) and no more than about 750 ppm fluoride (e.g., no more than about 500 ppm fluoride). The magnesium hydroxide particles of the invention typically exhibit hexagonal prism crystal shapes.

The magnesium hydroxide compositions of the invention have a median particle size (D50) of no more than about 0.30 µm, preferably no more than about 0.25 µm, more preferably no more than about 0.22 µm, and most preferably no more than about 0.20 µm. In some embodiments, the median particle size is no more than about 0.18 µm, or even no more than about 0.15 or no more than about 0.13 µm. Typically, the median particle size of the submicron particles of the invention will be about 0.05 to about 0.25 µm, more preferably about 0.08 to about 0.20 µm, and most preferably about 0.10 to about 0.15 µm (e.g., 0.10, 0.11, 0.12, 0.13, 0.14, or 0.15 µm).

The D90 value of the submicron compositions of the invention is preferably no more than about 6.0 µm, more preferably no more than about 5.0 µm, and most preferably no more than about 4.0 µm. In some embodiments, the D90 value is no more than about 3.5 µm or no more than about 3.0 µm. Particularly preferred embodiments of the invention feature a D90 value of no more than about 1.5 µm or no more than about 1.0 µm.

The BET surface area of the magnesium hydroxide compositions of the invention is at least about 35 m²/g, more preferably at least about 40 m²/g, and most preferably at least about 50 m²/g. In some embodiments, the BET surface area is about 48 m²/g to about 80 m²/g. Certain preferred embodiments feature a BET surface area of at least about 55 m²/g or at least about 60 m²/g. Exemplary BET surface areas of the submicron magnesium hydroxide compositions of the invention include about 35, about 38, about 40, about 42, about 44, about 46, about 48, about 50, about 52, about 55, about 58, about 60, about 62, about 65, about 68, about 70, about 72, about 75, about 78, and about 80 m²/g.

The magnesium hydroxide composition of the invention can be made using a variety of wet or dry milling methods and equipment known in the art. As understood in the art, a typical wet grinding mill useful for particle size reduction comprises an enclosed vessel filled with small spheres or beads referred to as grinding media, which are activated by an agitator shaft that creates shearing and impacting forces. The rotation of the agitator imparts energy to the surrounding media, and the forces generated act on a slurry of particles continuously pumped through the grinding chamber. The force applied to the particles in the slurry serve to tear apart and/or crush the particles, resulting in an overall reduction in particle size. The grinding media is retained inside the mill during the process. The primary process parameters are solids content of the slurry, agitator speed, product flow rate, and type and size of grinding media. Exemplary types of grinding mills include horizontal disk mills, high-energy pin mills, and the like.

In one aspect of the invention, the magnesium hydroxide composition of the invention is manufactured using a wet milling technique and a bead mill. There are a number of commercially available bead mills that can be used to perform the method of the invention. In one preferred embodiment, the bead mill is a DYNO®-Mill horizontal bead mill (type KDL) made by Willy A. Bachofen AG of Switzerland and having a 600 ml continuous glass-lined chamber and polyurethane impellers. The grinding media used in the method of the invention can vary. Preferred grinding media include zirconium oxide, zirconium silicate (Zircon), and yttrium-doped tetragonal zirconia polycrystals (YTZP). However, other media such as stainless steel or tungsten carbide could also be used.

The preferred size of the grinding media is no more than about 0.5 mm, more preferably no more than about 0.3 mm (e.g., about 0.1 mm to about 0.3 mm), and a preferred grinding media material is a zirconium oxide or other zirconia based media having a density of about 3.0 to about 6.8 g/cm$^3$. Preferably, the flow rate through the bead mill is about 1 to about 3 ml/second and the RPM of the mill is maintained during the grinding operation at no more than about 6,000 and no less than about 2,000 (e.g., about 2,500, about 3,000, about 3,500, about 4,000, about 4,500, about 5,000, or about 5,500). Typical grinding times are in the range of about 1 to about 6 hours.

A single grinding mill can be used to practice the invention. In such an embodiment, the slurry that is being grinded can be recycled through the mill until the desired particle size is reached. Alternatively, two or more grinding mills connected in series can be used, each successive grinding mill including a grinding media of a smaller size or each mill including the same size grinding media.

As noted in Example 1 below, it has been determined that the percentage of solids in the aqueous slurry of magnesium hydroxide particles fed to the grinding mill impacts the ability of the grinding process to produce the desired submicron particles. In a preferred embodiment, the initial aqueous slurry of magnesium hydroxide particles fed to the mill has a solids content of no more than about 62% by weight, based on the total weight of the aqueous slurry, more preferably no more than about 55%, and most preferably no more than about 52%. In one embodiment, the percentage of solids in the slurry is no more than about 50% or no more than about 45%. Typically, the solids content is maintained at a level between about 25% and about 62% during the grinding procedure, more preferably about 40% to about 62%.

The solids content and viscosity of the aqueous slurry can be monitored during the grinding process, and additional aqueous solution can be added as necessary to maintain a desired viscosity range or desired solids content during grinding, or a viscosity modifier may be added such as various surfactants (e.g., anionic surfactants) or polymers known in the art (e.g., PC546 anionic amine polymer available from Polymer Ventures) to adjust viscosity prior to grinding and/or during grinding.

As the aqueous liquid of the slurry is absorbed on the newly exposed surface area of the magnesium hydroxide particles (as the particles size is reduced by grinding), the viscosity of the slurry will increase. It is preferable to maintain the viscosity at no more than about 1,000 centipoise (cP), more preferably no more than about 800 cP, and most preferably no more than about 600 cP, while grinding. At the beginning of the grinding process, the viscosity of the starting material is typically as low as 100-200 cP, but the grinding process will cause viscosity to rise over time.

Both high and low viscosity can inhibit the grinding process. If the viscosity becomes too high, indicating a rise in solids content due to increased particle surface area during grinding, the milling process is less efficient. The magnesium hydroxide slurry becomes more difficult to pump and the particle interaction will not be ideal for reduction in particle size because of insufficient lubrication between the particles, which is needed to encourage particle impaction. If the viscosity is too low, indicating a very dilute slurry, the particles can be too far apart for efficient grinding. Note that it may be possible, in certain embodiments, to maintain the solids content of the slurry and/or the viscosity of the slurry at desired levels during grinding without taking any additional steps to adjust those parameters during grinding, such as by addition of more aqueous solution or viscosity modifier. For example, in certain cases, if the feed material has a sufficiently low solids content or a sufficiently high concentration of viscosity modifier, further additions of aqueous solution or viscosity modifier may be unnecessary to maintain the slurry at the desired viscosity level or solids content during grinding.

The aqueous slurry of magnesium hydroxide particles used in a starting material in the grinding process may comprise any aqueous solution known in the art. Most preferably, the aqueous solution is simply water, although the water may contain various dissolved additives if desired, such as viscosity modifying additives. The magnesium hydroxide particles in the aqueous slurry fed to the grinding apparatus can be, for example, any commercially available magnesium hydroxide product, such as MAGSHIELD® S or MAGSHIELD® UF magnesium hydroxide products made by Martin Marietta Magnesia Specialties Inc. Typically, the magnesium hydroxide particles in the feed material will have a D50 particle size of no less than about 0.9 μm and a BET surface area of no more than about 30 m$^2$/g. In one embodiment, the D50 particle size of the feed material is about 1 to about 8 μm.

Alternatively, the feed material can be magnesium oxide in particulate form, which will react with water to form magnesium hydroxide. Typically, a magnesium oxide feed material, such as a "light burn" magnesium oxide, will have a larger particle size than indicated above for magnesium hydroxide feed materials. The magnesium oxide can be hydrated into the hydroxide form prior to grinding or a slurry of magnesium oxide particles can be subjected to grinding without a prior hydration step such that magnesium hydroxide is primarily formed during the grinding process. The grinding process, coupled with the heat of reaction of the conversion of MgO to Mg(OH)$_2$, would result in the desired particle size noted herein.

In a further embodiment of the present invention, the magnesium hydroxide particles may be coated with a surface active agent, preferably an anionic surfactant, in order to reduce the tendency of the particles to agglomerate and to enable the particles to disperse more readily in a polymeric resin. Fatty acids and salts or esters thereof are preferred surface active coating agents, particularly fatty acids and derivatives thereof having 10 or more carbon atoms. Exemplary surface active agents include stearic acid, oleic acid, erucic acid, lauric acid, behenic acid, and palmitic acid and alkali metal salts thereof (e.g., sodium stearate, potassium stearate, calcium stearate, sodium oleate, potassium oleate, calcium oleate, sodium palmitate, potassium palmitate, calcium palmitate, sodium laurate, potassium laurate, and calcium laurate), ammonium stearate, sodium dilauryl benzenesulfonate, potassium octadecylfsulfate, sodium laurylsulfonate, and disodium 2-sulfoethyl-α-sulfostearate.

Other classes of surface active coating agents that can be used include (i) silane coupling agents such as vinylethoxysilane, vinyl-tris(2-methoxy)silane, γ-methacryloxypropyltrimethoxysilane, γ-aminopropyltrimethoxysilane, β-(3,4-epoxycyclohexyl)ethyltrimethoxysilane, γ-glycidoxypropyltrimethoxysilane and γ-mercaptopropyltrimethoxysilane; (ii) titanate-containing coupling agents such as isopropyltriisostearoyl titanate, isopropyltris(dioctylpyrophosphate), isopropyltri(N-aminoethyl-aminoethyl) titanate and isopropyltridecylbezenesulfonyl titanate; (iii) aluminum-containing coupling agents such as acetoalkoxyaluminum diisopropylate; (iv) phosphate esters such as mono- or diester of orthophosphoric acid and stearyl alcohol, a mixture of these esters or alkali metal salt of these esters or amine salt of these esters, and (v) anionic surfactants such as amide-bonding aliphatic carboxylate, amide-bonding sulfate, amide-bonding sulfonate, amide-bonding alkylallylsulfonate, sulfates of a higher alcohol such as stearyl alcohol, sulfates of polyethylene glycol ether, ester-bonding sulfates, ester-bonding sulfonates, ester-bonding alkylallylsulfonates, and ether-bonding alkylallylsulfonates. The surface active coating agents can be used singly or as a mixture of two or more.

When the magnesium hydroxide particles are surface-coated with the above surface-treating agents, the surface coating can be performed using various wet or dry coating methods known in the art. In a wet method, for example, the surface-treating agent in the form of a liquid or an emulsion is added to a slurry of the magnesium hydroxide particles followed by mechanical mixing. In a dry method, the surface-treating agent in the form of a liquid, an emulsion, or a solid is added to the magnesium hydroxide particles while the magnesium hydroxide particles are fully stirred in a mixer, such as a HENSCHEL® mixer, with or without the application of heat. In some cases, sufficient heat must be introduced during the mixing process in order to melt the surface-treating agent and, thus, encourage efficient mixing. The heat can be supplied from an external source or generated by the mixer itself. The amount of surface active coating material utilized can vary, but is typically about 10 weight percent or less based on the weight of the magnesium hydroxide particles.

In certain alternative embodiments of the invention, the submicron magnesium hydroxide composition of the invention can be used in combination with, or replaced with, a nanoclay material. Nanoclay materials are known in the art and are commercially available, for example, under the trade designation PERKALITE™ nanoclay, available from Akzo Nobel. Such materials may generally be defined as nanosized inorganic particles, e.g., platelet particles having a nanometer size range in at least one dimension thereof Generally the platelet particles can be described as modified clay materials with very high aspect ratios (the ratio of an object's length to its thickness). Thus the particles may also be described as having a very minimal thickness or diameter relative to their length.

As used herein, "platelet particles" are particles having two relatively flat opposite faces, the thickness of which is the distance between the faces, which is relatively small compared to the size of the faces. The platelet particles include an exfoliated layered inorganic material. Useful exfoliated inorganic materials include those derived from swellable layered materials including natural or synthetic phyllosilicate clays. Illustrative of such materials are smectic clay minerals such as montmorillonite, nontronite, beidellite, bentonite, volkonskoite, laponite, hectorite, saponite, sauconite, magadite, kenyaite, stevensite and the like, as well as vermiculite, halloysite, aluminate oxides, hydrotalcite and the like. These layered clays generally comprise particles containing a plurality of silicate platelets having a thickness of about 4-12 Å tightly bound together at interlayer spacings of 28 Å or less, and contain exchangeable cations or anions such as $OH^-$, $NO_3^-$, $CO_3^{-2}$, $Na^+$, $Ca^{+2}$, $K^+$ or $Mg^{+2}$ present at the interlayer surfaces.

The platelet particles used as a polymer additive herein have the thickness of the individual layers or small multiples less than about 10, preferably less than about 5, and more preferably less than about 3 of the layers, and still more preferably 1 or 2 layers. Preferably, intercalation of every interlayer space is complete so that all or substantially all individual layers delaminate one from the other to form separate platelet particles. Although not intending to be limited to such dimensions, generally such particles have an average thickness of less than about 20Å, and more preferably less than about 10 Å (e.g., about 3-6 Å), and an aspect ratio (length:thickness) ranging from about 1000 to about 1, most typically about 300 to about 400.

There are many methods to produce polymeric materials containing nanoclays, and these methods can be grouped into three general categories: (1) in situ polymerization; (2) solution intercalation; and (3) melt exfoliation. In the first two methods, such materials can be prepared by processes in which swelling agents, such as long-chain organic cations, and water-soluble oligomers or polymers, are intercalated or absorbed between adjacent layers of a layered silicate, such as smectite clay, to thereby increase the interlayer spacing between the adjacent silicate layers, so that polymer chains can be included between the silicate layers when mixing the layered silicate with a polymer melt. See for example, U.S. Pat. No. 5,552,469, WO 93/04117, Japanese Laid Open Patent Application Nos. 8-151,449, 7-207,134, 7-228,762, 7-331,092, 8-259,806, and 8-259,846. Melt exfoliation or melt intercalation is described, for example, in Polymer Layered Silicate Nanocomposites, Giannelis, Adv. Mater. 1996, 8, No. 1, 29. Unlike in situ polymerization or solution intercalation, melt exfoliation only involves the clay mineral and the polymer without the need for a swelling agent or a dispersion medium. However, a swelling agent may be used to enhance the exfoliation of the clay mineral by particular polymers. In melt exfoliation, the clay mineral and the polymer are mixed together, then heated to a temperature above the softening point of the polymer.

In the nanoclay/polymer nanocomposite material, two types of structures are possible. In one, the structure is intercalated, in which a single extended polymer chain is inserted between layers resulting in a well ordered multilayer with alternating polymer/inorganic layers. In another, referred to as disordered or delaminated, the inorganic layers are substantially uniformly dispersed in the polymer with random orientation throughout the polymer matrix.

In a preferred embodiment, the nanoclay used in the present invention is derived from hydrotalcite, an anionic clay comprising inorganic sheets of Mg and Al, with one embodiment having the formula $Mg_5Al_2CO_3(OH)_{16} \cdot H_2O$. An exemplary commercially-available embodiment is PERKALITE™ nanoclay, available from Akzo Nobel.

The above-described submicron magnesium hydroxide composition and/or nanoclay materials (which are also referred to as "the submicron additives" herein) can be mixed with other flame-retardant materials, such as other magnesium hydroxide particle distributions, prior to incorporation into a polymeric resin. For instance, the submicron additives can be mixed with commercially available magnesium hydroxide compositions, such as MAGSHIELD® S or MAGSHIELD®UF magnesium hydroxide products. If the submicron additives of the invention are admixed with a second magnesium hydroxide particle distribution, the submicron additives are typically present in an amount of at least about 3 weight percent based on the total weight of the magnesium hydroxide particles and submicron additives, more preferably at least about 5%, and most preferably at least about 10%. In one embodiment, the submicron additives of the invention is present in an amount of about 3% to about 30% weight percent based on the total weight of the submicron additives and the other flame-retardant materials such as other particle distributions of magnesium hydroxide, more preferably about 3% to about 15% by weight.

The larger-sized magnesium hydroxide particle distribution that is mixed with the submicron magnesium hydroxide composition of the invention (or the nanoclay material) is typically characterized by a D50 of at least about 0.9 µm (e.g., a D50 of about 1 to about 8 µm) and a BET surface area of no more than about 30 m$^2$/g, more preferably no more than about 20 m$^2$/g, and most preferably no more than about 15 m$^2$/g. The types of magnesium hydroxide particle distributions that are suitable for admixing with the composition of the invention are also suitable for use as the particulate material in the feed slurry used to make the submicron magnesium hydroxide composition. As would be understood, the particle composition resulting from admixture of the submicron magnesium hydroxide composition of the invention with a second particle distribution would be characterized by particle sizes and a BET surface area between the particle size values and BET surface area values of the two particle distributions that are admixed. By admixing the submicron additives with the larger-sized magnesium hydroxide particle distribution, one can potentially reduce the overall amount of flame retardant additives required in certain polymer resin applications.

In another aspect, the present invention provides polymeric compositions, and articles made therefrom, comprising the submicron magnesium hydroxide composition of the invention and/or a nanoclay and a synthetic polymeric resin. The polymeric resin can be, for example, a thermoplastic resin, a thermosetting resin, or an elastomer. Typically, the polymer will fall within one of the following polymer classes: polyolefin, polyether (including all epoxy resins, polyacetal, polyetheretherketone, polyetherimide, and poly(phenylene oxide)), polyamide (including polyureas), polyamideimide, polyarylate, polybenzimidazole, polyester (including polycarbonates), polyurethane, polyimide, polyhydrazide, phenolic resins, polysilane, polysiloxane, polycarbodiimide, polyimine, azo polymers, polysulfide, and polysulfone.

The synthetic resin to be blended with the magnesium hydroxide particles (or nanoclay) of the present invention is preferably a synthetic resin that is generally used for producing molded articles, as exemplified by olefin (α-olefin) polymers and copolymers such as polyethylene (e.g., high-density polyethylene, low-density polyethylene, linear low-density polyethylene, and ultra-low density polyethylene), polypropylene, ethylene/propylene copolymer, polybutene, and poly(4-methylpentene-1); copolymers of olefins with dienes (e.g., ethylene-butene-1 copolymer, ethylene-4-methylpentene copolymer, propylene-butene-1 copolymer, and propylene-4-methylpentene-1 copolymer); ethylene-acrylate copolymers (e.g., ethylene ethyl acrylate resin (EEA), ethylene methyl acrylate copolymer resin (EMA), and ethylene acrylate copolymer resin (EAA)); polystyrene and copolymers of styrene such as acrylonitrile-butadiene-styrene (ABS), acrylonitrile-styrene copolymer (AS), and acrylonitrile-acrylate-styrene (AAS); thermoplastic polyolefin (TPO); vinyl chloride or vinyl acetate polymers or copolymers such as polyvinyl chloride, polyvinyl acetate, polyvinylidene chloride, ethylene-vinyl chloride copolymer, and ethylene-vinyl acetate copolymer (EVA); phenoxy resin; polyacetal; polyamide resins such as nylon-6 and nylon-66; acrylic and methacrylic resin; butadiene; polyurethane; polyester (e.g., polyethylene terephthalate (PET) and polybutylene terephthalate (PBT)); polycarbonate; polyketone; diallyl phthalate resin; phenolic resin; epoxy resin; melamine resin; alkyd resin; urea resin; and rubbers such as styrene-butadiene rubber (SBR), ethylene-propylene diene monomer (EPDM), butadiene rubber (BR), chloroprene rubber (CR), chlorinated polyethylene (CPE), chlorosulfonated polyethylene (CSM), acrylonitrile-butadiene rubber (NBR), isoprene rubber (IR), butyl rubber (IIR), urethane rubber, acryl rubber, silicone rubber, and fluorine rubber.

The synthetic polymer can be homopolymers of any of the foregoing polymers, random copolymers, block copolymers, alternating copolymers, random tripolymers, block tripolymers, alternating tripolymers, derivatives thereof (e.g., graft copolymers, esters, or ethers thereof), and the like. The polymer molecular weight is not considered a limiting factor in the present invention, and the number average molecular weight will typically be in the range from about 250 to more than 500,000 Da, although any molecular weight could be used without departing from the invention.

The polymeric resin composition can further include one or more additives known in the art without departing from the present invention. Exemplary further additives include, without limitation, colorants (e.g., fluorescent dyes and pigments), odorants, deodorants, plasticizers, impact modifiers, fillers, nucleating agents, lubricants, surfactants, wetting agents, flame retardants in addition to the magnesium hydroxide particles of the invention, ultraviolet light stabilizers, antioxidants, biocides, metal deactivating agents, thickening agents, heat stabilizers, defoaming agents, polymer alloy compatibilizing agent, blowing agents, emulsifiers, crosslinking agents, waxes, particulates, flow promoters, and other materials added to enhance processability or end-use properties of the polymeric components. Such additives can be used in conventional amounts, and typically do not exceed 10% by weight of the total composition.

The total amount of flame-retardant additives to be added to the polymeric resin, meaning the total amount of all particle distributions of magnesium hydroxide and all submicron additives of the invention (e.g., submicron magnesium hydroxide or nanoclays), can vary and depends on a variety of factors including the desired level of flame resistance, the type of polymer resin, the polymer article to be formed, and the like. Typically, the total amount of flame-retardant additives will be about 1 to about 80 weight percent based on the total weight of the polymer resin (with additives), more preferably about 35 to about 80 weight percent, and most preferably about 50 to about 80 weight percent, based on the total weight of the polymer resin and the flame-retardant additives. It is preferable to add sufficient flame-retardant additives, such as sufficient magnesium hydroxide or nanoclay, to obtain a UL 94 (Standard for Tests for Flammability of Plastic Materials for Parts in Devices and Appliances, 5$^{th}$ Edition; Underwriters Laboratories Inc.) rating of at least V2 or better, more preferably V1 or better, and most preferably V0. Further, it is preferable to add sufficient magnesium hydroxide or nanoclay to obtain a Heat Release Capacity (HRC) value of not more than about 270 J/g·K, more preferably no more than about 260 J/g·K, and most preferably no more than about 250 J/g·K.

As noted above, the flame-retardant additives can comprise combinations of nanoclay materials or submicron magnesium hydroxide compositions as described herein with other flame-retardant additives such as larger-sized magnesium hydroxide particle distributions. Such combinations include larger-sized magnesium hydroxide particle distributions such as MAGSHIELD® S or MAGSHIELD® UF magnesium hydroxide products combined with a nanoclay, larger-sized magnesium hydroxide particle distributions combined with a submicron magnesium hydroxide particle distribution according to the invention, and larger-sized magnesium hydroxide particle distributions combined with both a nanoclay and a submicron magnesium hydroxide composition. The combinations can be in the form of intimate mixtures prior to addition to the polymer resin, or the two or more flame-retardant additives can be separately dispersed in a polymer resin. In such combinations, the larger-sized magnesium hydroxide particle distribution is typically present in an amount of about 50-70 weight percent, based on the total polymer resin weight (with additives), more preferably about 50 to about 65 weight percent, and the submicron magnesium hydroxide or nanoclay component is present in an amount of about 2 to about 30 weight percent, more preferably about 4 to about 20 weight percent, and most preferably about 6 to about 15 weight percent. Such additive compositions are typically in the form of mixtures that can be prepared using a variety of mixing equipment known in the art.

Polymeric compositions comprising the magnesium hydroxide composition of the present invention or other flame-retardant additives can be formed by, for example, blending, kneading, and molding of the synthetic polymer resin and the magnesium hydroxide particles or other additives to form a homogenous mixture using any methods and equipment known in the art. For example, a mixture of the magnesium hydroxide particles and the polymeric resin can be melt-kneaded with an open roll, single-screw, or double-screw extruder, Banbury mixer, or the like. Thereafter, the resin mixture can be molded into the shape of the final desired article using any means known in the art, such as injection molding, extrusion molding, blow molding, press molding, rotational molding, inflation molding, and the like.

The polymeric articles formed using the synthetic polymer resin/magnesium hydroxide particle mixture described above can be used in a variety of applications and products, such as cable and wire sheathing for power transportation and telecommunications, various electronics applications, automobile components, commercial and residential building products, mass transportation vehicle components, or in various aerospace/defense applications.

The submicron magnesium hydroxide compositions of the invention can also be used as an additive to prevent the formation of slag resulting from fossil fuel combustion in oil-burning power plants. For this purpose, the magnesium hydroxide compositions can be used in powder form, in aqueous slurry form, or in the form of a dispersion in a hydrocarbon fluid (e.g., No. 2 oil, kerosene, or SAE 30 motor oil). Regardless of the form, the magnesium hydroxide composition is added to a fuel oil (e.g., No. 6 fuel oil) prior to combustion. In one embodiment, the magnesium hydroxide composition of the invention is dispersed in a light fuel oil at a concentration of about 25 to about 80 weight percent, based on the total weight of the dispersion, more preferably about 30 to about 50 weight percent.

In yet another aspect of the invention, the magnesium hydroxide compositions of the invention can be used as a reactive precursor in the manufacture of other magnesium derivatives, such as magnesium oxide or magnesium carbonates (e.g., magnesite, basic magnesium carbonate, nesquehonite, etc.). Given the submicron size of the compositions of the invention, the final magnesium derivative formed using the magnesium hydroxide of the invention would be expected to also exhibit the same submicron size, which could be valuable in many applications.

The present invention will be further illustrated by the following non-limiting examples.

EXPERIMENTAL

Example 1

Submicron Magnesium Hydroxide Particle Production

Studies were conducted on a DYNO®-Mill (type KDL) using different sized zirconia grinding media on a $Mg(OH)_2$ slurry. Initial tests were conducted with grinding media in the size range of 0.6 mm to 0.8 mm, with changes in the RPMs of the mill and grinding time. The results of these initial tests are presented in Table 1 below.

TABLE 1

| Media size, mm | RPM | Time, hr. | % solids of slurry | D50, microns |
|---|---|---|---|---|
| 0.6-0.8 | 3,000 | 1 | 55.8 | 0.51 |
| 0.6-0.8 | 3,000 | 2 | 55.8 | 0.44 |
| 0.6-0.8 | 4,500 | 2 | 55.8 | 0.75 |
| 0.6-0.8 | 4,500 | 3 | 50.4 | 0.858 |
| 0.6-0.8 | 6,000 | 1 | 50.4 | 0.864 |

From the above tests, it was observed that increased RPMs of the mill and increased milling time had a negative effect upon the ability to grind the $Mg(OH)_2$ particles. It was observed that the water that kept the particles in suspension was absorbed on the newly exposed surface area due to the kinetic energy of the milling process, and as the slurry viscosity thickened, the effectiveness of the grinding media/Mg$(OH)_2$ contact area declined.

In an attempt to correct this problem and reduce the particle size further, the grinding media size was reduced to 0.3 mm, the % solids of the slurry reduced to less than 55% by water addition, and the RPMs of the mill reduced. The D50 of the mill feed slurry was 1.70 microns, and the results from these tests are shown below in Table 2 below.

TABLE 2

| Media size, mm | RPM | Time, hr. | % solids of slurry | D50, microns |
|---|---|---|---|---|
| 0.3 | 2,000 | 1 | 52.0 | 0.295 |
| 0.3 | 2,000 | 2 | 52.0 | 0.284 |
| 0.3 | 2,000 | 3 | 44.0 | 0.249 |
| 0.3 | 2,000 | 4 | 44.0 | 0.238 |
| 0.3 | 3,000 | 1 | 50.8 | 0.261 |
| 0.3 | 2,000 | 3 | 52.0 | 0.130 |

By making these changes, it was discovered that it was possible to produce $Mg(OH)_2$ particles with a D50 of less then 0.3 microns within 1 hour milling time, and with reduced RPMs of the mill. From these results it is apparent that increased milling time does contribute to further particle size reduction, particularly provided the % solids is maintained at less than approx. 55% and viscosity is maintained at less than about 600 cP. Of particular interest is the effect of increasing the mill to 3,000 RPMs with 1 hour milling time to produce a D50 of 0.261 microns compared to the D50 of 0.295 microns produced at 2,000 RPM for the 1 hour time interval. However, other mill RPM and solids loadings are also effective.

Example 2

Further Examples of Submicron Magnesium Hydroxide Particle Production

Magnesium hydroxide particles having a size of 0.1 to 0.3 micron were produced by use of a media mill. This mill was charged with a zirconium oxide media and operated by recycling a slurry of magnesium hydroxide. Recycling the slurry was continued until the desired median particle size was obtained. Several operational parameters were investigated, including media size, mill rotor RPM, slurry feed rate, slurry solids concentration, source of magnesium hydroxide, and use of additives. Three different methods of producing the target product are described below.

The milling equipment utilized in this example is described as follows:

1. Media mill using a 600 mL glass water cool milling chamber (DYNO®-Mill type KDL).
2. Urethane impellers.
3. Slurry reservoir was either a large funnel of 2 liter volume or a 4 liter stainless steel beaker.
4. Overhead stirrer.
5. Peristaltic pump; Masterflex 7518-60 head.
6. The grinding media was 0.3 mm zirconium oxide; specific gravity of 6.0 g/cc.

The measurements described in this data were measured as follows:

1. Surface area measured by BET single point using a MICROMERITICS® FLOWSORB II 2300.
2. Particle size measured using a MICROMERITICS® Sedigraph 5100 in water (50 ml water and 3 grams of sample).
3. Solids determined by evaporation.
4. Viscosity run using Brookfield Viscometer model RVD-VII+ number 3 spindle at 100 RPM.

A. Process Run Resulting in 0.17 Micron Particle Size and 62.6 $m^2$/g Surface Area FLOMAG®H (available from Martin Marietta Materials) slurry started with solids content of 40%. The mill feed was started with 1500 ml of slurry charged to the mill. Then 500 ml of the slurry was disposed of during the initial flush out of the mill. The mill was started at 3000 RPM and the flow rate adjusted to 83 ml/minute. The slurry was discharged into a reservoir. The reservoir was a two-liter funnel that was plumbed to the mill feed line. This reservoir was under constant agitation using an overhead mixer. The slurry was then recycled back into the mill. The total run time was five hours. During the run, 525 ml water was added to product during milling at an average of 37.5 ml every 17.5 minutes. This produced a final product of 62.6 $m^2$/g surface area and median particle size of 0.17 µm.

Water was added during the process because, as the surface area of the FLOMAG®H increases, the slurry becomes thicker. Although not bound by any particular theory, this is thought to be due to the absorption of water on the surface of the magnesium hydroxide particles and the chloride content.

B. Process Run Resulting in 0.103 Micron Particle Size and 49.5 $m^2$/g Surface Area Milling a hydrated MAGCHEM® 10-325 MgO (available from Martin Marietta Materials) produced this product. The MAGCHEM® 10-325 was used as a source of chloride free material. Testing indicated that chloride content is one of several factors contributing to the slurry thickening during milling. MAGCHEM® 10-325 was hydrated for 4 hours at 25 psi in a pressure cooker, such as described in RE 36,369 to Wajer et al, which is incorporated herein by reference in its entirety.

A weight Loss on Ignition (LOI) test was used to determine the degree of hydration of MgO, with an LOI of greater than 30% typically indicating that the MgO has converted to the hydroxide form. This test is conducted by using a pre-weighed amount of hydroxide sample in a tared crucible. The crucible containing the sample is placed in a furnace at >850° C. for a minimum of 1 hour. The crucible and its contents (now converted back to MgO) are allowed to cool in a desiccator, and thereafter reweighed to determine the weight loss, which is reported on a percentage basis. The LOI of the hydrated product in this example was 30.86% and the surface area was 5.49 $m^2$/g.

25% slurry was produced after MAGCHEM® 10-325 was hydrated by steam pressure. 1500 ml of slurry was charged to the mill. Then 500 ml of the slurry was disposed of during the initial flush out of the mill. The mill was started at 3000 RPM and the flow rate adjusted to 125 ml/minute. The slurry was discharged into a reservoir. The reservoir was a two-liter funnel that was plumbed to the mill feed line. This reservoir was under constant agitation using an overhead mixer. The slurry was then recycled back into the mill. The total run time was three hours. No additions of water were made during the run time or after. This produced a final product of 49.5 $m^2$/g surface area and median particle size of 0.103 µm. 92% of the product was smaller than 1 micron.

C. Process Run Resulting in 0.103 Micron Particle Size and 54.5 $m^2$/g Surface Area A 30% slurry of FLOMAG®H was made to which 1000 ppm of POLYMER VENTURES® PC-546 was added on a total volume basis of the slurry. POLYMER VENTURES® PC-546 is an anionic amine polymer. Then the slurry was passed though a 325 mesh sieve. This was done to remove any plus 44 µm particles that may have been present in the slurry. The mill feed was started with 3500 ml of slurry charged to the mill. Then 500 ml of the slurry was disposed of during the initial flush out of the mill. The mill was started at 3000 RPM and the flow rate adjusted to 98 ml/minute. The slurry was discharged into a reservoir. The reservoir was a four-liter stainless beaker that was plumbed to the mill feed line. This reservoir was under constant agitation using an overhead mixer. The slurry was then recycled back into the mill. The total run time was six hours. No additions of water were made during the run time or after. The POLYMER VENTURES® PC546 was added to counteract the chloride effect on viscosity. This produced a final product of 54.5 $m^2$/g surface area and median particle size of 0.103 µm. 92% of the product was smaller than 1 micron.

This example illustrates that a media mill can make a magnesium hydroxide with a median particle size of 0.1 micron. This process can be carried out using several different feed sources, such as a slurry similar to FLOMAG®H or a hydrated magnesium oxide. The process may use, for example, a slurry diluted to 30% or lower. This dilution may take place during the milling process or before the milling process. Dilution prior to the mill is advantageously accompanied by use of an anionic polymer to effect best milling of the slurry. It is important to counteract the chloride content of a starting slurry material with a significant chloride content, such as FLOMAG®H, by constant dilution of the slurry during the process to keep the milling action working, or by use of an additive such a POLYMER VENTURES® PC546. Use of a hydrated low chloride source of magnesium oxide to make the slurry feed effectively removes the chloride influence on milling and slurry characteristics such as viscosity.

Example 3

Polymer/Mg(OH)$_2$ Blending and Flammability Testing

To determine the flame retardant capability of the submicron Mg(OH)$_2$ of the invention, it was compared to other samples of Mg(OH)$_2$ of different sizes in a polypropylene resin formulation. The various magnesium hydroxides samples are listed with the BET surface area and D50 listed for each sample in Table 3 below. The submicron magnesium hydroxide is labeled as 'Submicron'.

TABLE 3

| Sample Name | Surface Area, m$^2$/g | D 50, microns |
|---|---|---|
| MAGSHIELD ® S* | 13.3 | 4.44 |
| MAGSHIELD ® UF* | 13.6 | 0.96 |
| Brucite (natural) | 12.6 | 1.67 |
| Submicron | 39.6 | 0.223 |
| 50% UF & 50% Submicron Blend | 22.4 | 0.35 |

*Commercially available magnesium hydroxide products made by Martin Marietta Magnesia Specialties Inc.

It is interesting to point out that the MAGSHIELD® S or UF products can be used as the feed material to produce the Submicron material. As one can observe, as the magnesium hydroxide is milled to the smaller particle size, there is a significant increase in the BET surface area of the Submicron material.

The above samples were blended with polypropylene, calcium stearate, and a plastic stabilizer in a BRABENDER® rheometer (50 g samples). The samples composed 62% to 65% by weight of the magnesium hydroxide, 0.75 weight percent calcium stearate (except one sample with additional calcium stearate as noted below), and 0.2 weight percent of antioxidant. The rheology tests (ran in triplicate for each blend) were conducted at 210 to 220° C. and the torque determined. The results are set forth in Table 4 below.

TABLE 4

| Sample | Torque, meter-g. |
|---|---|
| Submicron | 340-360 |
| 50% UF & 50% Submicron | 340-360 |
| Submicron & 3% Calcium St. | 320-330 |
| MAGSHIELD ® S | 320-330 |
| MAGSHIELD ® UF | 280-300 |
| Brucite (natural) | 240-260 |

The data show that the Submicron containing samples produce the highest torque values. To reduce the torque of the Submicron/polypropylene blend, additional calcium stearate was added to the level of 3% by weight of the Submicron/polypropylene blend, which did reduce the torque and allowed better dispersion of the particles in the plastic resin. The lowest torque value was obtained with the naturally occurring Brucite sample. To test the flame retardancy of the magnesium hydroxide/polypropylene blends, the above samples were submitted for Microscale Combustion Calorimeter analysis. The samples were tested in triplicate and data obtained. A sample of 100% polypropylene was tested to obtain a baseline as to the effectiveness of the various magnesium hydroxides in retarding the burning of the resin.

The results relate to the peak heat release and are reported below in Table 5 as the Heat Release Capacity (HRC), which has units J/g·K. Values of HRC are obtained and a reduction or increase of this value from a selected standard indicates flame retardant effectiveness.

LOI or Limiting Oxygen Index, commonly referred to as Oxygen Index, is determined according to ASTM E2863, and is a fire response test which measures the concentration of oxygen required to just support flaming combustion in a flowing mixture of oxygen and nitrogen. The sample is exposed in a candle-like position and oxygen content is measured as a percentage of oxygen (v/v). Polyolefins without flame retardants have an Oxygen Index of about 16%. The atmosphere we breathe is about 21% oxygen. Values above 21% oxygen indicate flame retardant effect. LOI results are also reported below in Table 5.

TABLE 5

| Sample | Heat Release Capacity | LOI |
|---|---|---|
| 100% Polypropylene | 1183 | 16 |
| Brucite-Natural | 402 | 25 |
| MAGSHIELD ® S | 300 | 28 |
| MAGSHIELD ® UF | 288 | 28 |
| Submicron | 261 | 29 |
| Submicron & 3% Calcium St. | 250 | 30 |
| 50% UF & 50% Submicron | 254 | 30 |

As anticipated, all the magnesium hydroxides provided flame retardancy to the resin, but the Submicron containing samples provided the lowest HRC values (greatest flame retardant capacity). The MAGSHIELD® UF had a D50 of 0.96 microns, which provided better dispersion in the resin and resultant better HRC value than the MAGSHIELD® S with a D50 of 4.44 microns. But when the Submicron magnesium hydroxide with a D50 of 0.223 microns was used, further reduction in the HRC value over the MAGSHIELD® UF sample was obtained. This improvement is likely attributable to the better dispersion of the smaller Submicron particles in the resin. The better dispersion of the Submicron particles was magnified when the additional calcium stearate was added. Since the calcium stearate acts as a lubricant when it melts, it helped to better disperse the Submicron particles, and resulted in an additional drop of the HRC value by 11 units (from 261 to 250). Additionally, the 50% addition of Submicron particles to the MAGSHIELD® UF, provided a reduction of 34 HRC units over the 100% MAGSHIELD® UF formulation. Although these tests were conducted with polypropylene resin, similar benefits would be expected in different resin mixtures.

Example 4

Polymer/Mg(OH)$_2$ and Polymer/Hydrotalcite Blending and Flammability Testing Cone calorimeter heat release determinations were performed on five different 10 cm diameter circular discs (3.2 mm thickness) comprising polypropylene and various magnesium hydroxide or hydrotalcite additives. The cone calorimeter is a small scale test conducted according to ASTM E 1354-04a, and is intended to show the reaction of the test material to a heat source that could cause the test material to burn. In these tests, an incident heat of 50 kW/m$^2$ was used. The test samples were subjected to this radiant energy, which simulates the energy of a well-developed fire. Additionally, the five samples were evaluated to determine the actual amount of filler present using an ashing procedure involving placing the sample in a muffle furnace and burning off all organic components. The remainder is metal oxide. The amount of metal hydrate is calculated from this oxide remnant.

The formulations for each sample are set forth below:

Control: This sample was planned to have 65% by weight (based on total sample weight) MAGSHIELD® UF magnesium hydroxide without any further flame-retardant additives. The actual total amount of MAGSHIELD® UF magnesium hydroxide was found to be 59.5% by weight.

MM2: This sample was planned to have 60% by weight MAGSHIELD® UF magnesium hydroxide and 5% by weight of PERKALITE™ hydrotalcite particles (Akzo Nobel). The actual total filler content was found to be 60.1% (combined weight of magnesium hydroxide and hydrotalcite).

MM3: This sample was planned to have 63% by weight MAGSHIELD® UF magnesium hydroxide and 2% by weight PERKALITE™ hydrotalcite particles. The actual total filler content was found to be 61.7% by weight.

MM5: This sample was planned to have 55% by weight MAGSHIELD® UF magnesium hydroxide and 10% by weight submicron $Mg(OH)_2$ prepared according to the invention, the submicron particles having a particle size of 0.11 microns and a surface area of about 44.4 $m^2/g$. The actual total filler content was found to be 64.3% by weight.

MM7: This sample was planned to have 60% by weight MAGSHIELD® UF magnesium hydroxide and 5% by weight of the same submicron $Mg(OH)_2$ particles prepared according to the invention and used in sample MM5. The actual total filler content was found to be 64.9% by weight.

Since there was variation in the total amounts of both MAGSHIELD® UF magnesium hydroxide and the other flame-retardant filler materials, it was necessary to normalize the results from the cone calorimeter. When variations are small (less than 15% as is the case here), normalization can be done through a simple adjustment technique. The peak heat release value is multiplied by the determined amount of mineral filler. That result is divided by the original desired filler amount.

The submicron magnesium hydroxide particles and hydrotalcite particles significantly reduced peak heat release and three-minute heat release as compared to the control in the cone testing. The hydrotalcite was marginally more effective than the submicron magnesium hydroxide. Note that MM7 showed considerable variation (in repeat testing) and therefore is of questionable reliability.

The percent peak heat release (% PHR) reduction and the percent 3 minute PHR reduction results are shown below in Table 6.

TABLE 6

| Sample | % PHR reduction | % 3 min PHR reduction |
| --- | --- | --- |
| MM2 | 16.8 | 25.6 |
| MM3 | 10.3 | 28.7 |
| MM5 | 6.4 | 34.4 |
| MM7 | 12.4 | 34.4 |

To support the conclusion that these materials provide significantly increased flammability protection, a standard widely-used flammability test, UL 94, was run on each of the samples at two thicknesses, 3.2 mm and 1.6 mm. Results are shown below in Table 7, and confirm the increased flammability protection indicated by the cone testing for the submicron magnesium hydroxide and hydrotalcite materials evaluated in testing.

TABLE 7

| Test | Control | MM2 | MM3 | MM5 | MM7 |
| --- | --- | --- | --- | --- | --- |
| UL94 (3.2 mm) | V1 | V0 | V0 | V0 | V0 |
| UL94 (1.6 mm) | NR | V1 | V2 | V2 | V2 |

NR means not rated. UL94 V0 results cannot be normalized due to the nature of the test method. However, this does not adversely affect the conclusion that all test samples performed better than the control in this flammability test.

Many modifications and other embodiments of the inventions set forth herein will come to mind to one skilled in the art to which these inventions pertain having the benefit of the teachings presented in the foregoing description. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A magnesium hydroxide particulate composition, comprising a first distribution of magnesium hydroxide particles having a D50 of no more than about 0.30 μm, a D90 of no more than about 1.5 μm, and a BET surface area of at least about 35 $m^2/g$.

2. The magnesium hydroxide particulate composition of claim 1, wherein the D50 is no more than about 0.25 μm.

3. The magnesium hydroxide particulate composition of claim 2, wherein the D50 is no more than about 0.22 μm.

4. The magnesium hydroxide particulate composition of claim 1, wherein the D90 is no more than about 1.0 μm.

5. The magnesium hydroxide particulate composition of claim 1, wherein the BET surface area is at least about 40 $m^2/g$.

6. The magnesium hydroxide particulate composition of claim 5, wherein the BET surface area is at least about 50 $m^2/g$.

7. The magnesium hydroxide particulate composition of claim 1, wherein the particles are coated with a surface active agent.

8. The magnesium hydroxide particulate composition of claim 7, wherein the surface active agent is a fatty acid or a salt or ester thereof.

9. The magnesium hydroxide particulate composition of claim 7, wherein the surface active agent is calcium stearate or stearic acid.

10. The magnesium hydroxide particulate composition of claim 1, further comprising a second distribution of magnesium hydroxide particles mixed with said first distribution, said second distribution having a D50 of at least about 0.9 μm and a BET surface area of no more than about 30 $m^2/g$.

11. A flame-retardant additive composition, comprising (a) a first distribution of magnesium hydroxide particles having a D50 of at least about 0.9 μm and a BET surface area of no more than about 30 $m^2/g$; and (b) a second composition comprising (i) a plurality of nanoclay particles; (ii) a second distribution of magnesium hydroxide particles having a D50 of no more than about 0.30 μm, a D90 of no more than about 1.5 μm, and a BET surface area of at least about 35 $m^2/g$; or (iii) a combination of (i) and (ii).

12. The flame-retardant additive composition of claim 11, wherein the second composition (b) comprises the second distribution of magnesium hydroxide particles (ii), and the D50 of said second distribution is no more than about 0.22 µm.

13. The flame-retardant additive composition of claim 11, wherein the second composition (b) comprises the second distribution of magnesium hydroxide particles (ii), and the D90 of said second distribution is no more than about 1.0 µm.

14. The flame-retardant additive composition of claim 11, wherein the second composition (b) comprises the second distribution of magnesium hydroxide particles (ii), and the BET surface area of said second distribution is at least about 50 $m^2/g$.

15. The flame-retardant additive composition of claim 11, wherein the second composition (b) comprises the second distribution of magnesium hydroxide particles (ii), and the particles of said second distribution are coated with a surface active agent.

16. The flame-retardant additive composition of claim 15, wherein the surface active agent is a fatty acid or a salt or ester thereof.

17. The flame-retardant additive composition of claim 15, wherein the surface active agent is calcium stearate or stearic acid.

18. The flame-retardant additive composition of claim 11, wherein the second composition (b) comprises the nanoclay particles (i), and the nanoclay particles are derived from a hydrotalcite.

19. A polymeric resin composition comprising a mixture of a synthetic polymer and the magnesium hydroxide composition according to claim 1.

20. The polymeric resin composition of claim 19, wherein the synthetic polymer is selected from the group consisting of olefin (α-olefin) polymers and copolymers, copolymers of olefins with dienes, ethylene-acrylate copolymers, polystyrene and copolymers of styrene, thermoplastic polyolefin (TPO), vinyl chloride or vinyl acetate polymers or copolymers, phenoxy resin, polyacetal, polyamide resin, acrylic and methacrylic resin, butadiene, polyurethane, polyester, polycarbonate, polyketone, diallyl phthalate resin, phenolic resin, epoxy resin, melamine resin, alkyd resin, urea resin, and synthetic rubbers.

21. A molded polymeric article comprising the polymeric resin composition of claim 19.

22. The molded polymeric article of claim 21, having a UL 94 rating of V0, V1, or V2.

23. A polymeric resin composition comprising a mixture of a synthetic polymer and the flame-retardant additive composition according to claim 11.

24. The polymeric resin composition of claim 23, wherein the synthetic polymer is selected from the group consisting of olefin (α-olefin) polymers and copolymers, copolymers of olefins with dienes, ethylene-acrylate copolymers, polystyrene and copolymers of styrene, thermoplastic polyolefin (TPO), vinyl chloride or vinyl acetate polymers or copolymers, phenoxy resin, polyacetal, polyamide resin, acrylic and methacrylic resin, butadiene, polyurethane, polyester, polycarbonate, polyketone, diallyl phthalate resin, phenolic resin, epoxy resin, melamine resin, alkyd resin, urea resin, and synthetic rubbers.

25. A molded polymeric article comprising the polymeric resin composition of claim 23.

26. The molded polymeric article of claim 25, having a UL 94 rating of V0, V1, or V2.

27. The polymeric resin composition of claim 23, wherein the flame-retardant additive composition is present in an amount of about 50 to about 80 weight percent based on the total weight of the polymer resin composition.

28. The polymeric resin composition of claim 27, wherein the polymeric resin comprises 50 to about 70 weight percent of the first distribution of magnesium hydroxide particles (i), and about 2 to about 30 weight percent of the second composition (ii), based on the total weight of the polymer resin composition.

29. A method of manufacturing a magnesium hydroxide particulate composition, comprising:
  (a) providing an aqueous slurry of magnesium hydroxide particles or magnesium oxide particles;
  (b) grinding the aqueous slurry in a bead mill with a grinding media having a diameter of no more than about 0.5 mm for a time and under conditions sufficient to produce a slurry of magnesium hydroxide particles having a D50 of no more than about 0.30 µm, a D90 of no more than about 1.5 µm, and a BET surface area of at least about 35 $m^2/g$; and
  (c) maintaining at least one of the following conditions during the grinding step:
    (i) the solids content of the aqueous slurry at no more than about 62% by weight; and
    (ii) the viscosity of the aqueous slurry at no more than about 1,000 cP.

30. The method of claim 29, wherein said grinding step is continued for about 1 to about 6 hours.

31. The method of claim 29, wherein the aqueous slurry is maintained at a solids content of no more than about 55% by weight during the grinding step.

32. The method of claim 29, wherein the viscosity of the aqueous slurry is maintained at no more than about 800 cP during the grinding step.

33. The method of claim 29, wherein said step of maintaining the viscosity of the aqueous slurry at no more than about 1,000 cP comprises adding a viscosity modifier to the aqueous slurry before or during said grinding step.

34. The method of claim 29, wherein the grinding media has a diameter of about 0.1 to about 0.3 mm.

35. The method of claim 29, wherein the grinding media is selected from the group consisting of zirconium oxide, zirconium silicate, yttrium-doped tetragonal zirconia polycrystals, stainless steel, and tungsten carbide.

36. The method of claim 29, wherein the grinding media is a zirconia based media having a density of about 3.0 to about 6.8 $g/cm^3$.

37. The method of claim 29, wherein the RPM of the bead mill is maintained at no more than about 6,000 and no less than about 2,000 during said grinding step.

* * * * *